United States Patent
Devitt-Carolan (10) Patent No.: US 10,356,221 B2
(45) Date of Patent: Jul. 16, 2019

(54) ACCESS TO NETWORK-BASED STORAGE RESOURCE BASED ON HARDWARE IDENTIFIER

(71) Applicant: HEWLETT-PACKARD DEVELOPMENT COMPANY, L.P., Houston, TX (US)

(72) Inventor: Taram Sierra Devitt-Carolan, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 23 days.

(21) Appl. No.: 15/510,045

(22) PCT Filed: Dec. 4, 2014

(86) PCT No.: PCT/US2014/068597
§ 371 (c)(1),
(2) Date: Mar. 9, 2017

(87) PCT Pub. No.: WO2016/089411
PCT Pub. Date: Jun. 9, 2016

(65) Prior Publication Data
US 2017/0302761 A1 Oct. 19, 2017

(51) Int. Cl.
*G06F 15/16* (2006.01)
*H04L 29/06* (2006.01)
*G06F 16/13* (2019.01)
*G06F 16/182* (2019.01)
*G06F 16/188* (2019.01)
*G06F 16/28* (2019.01)

(52) U.S. Cl.
CPC .............. *H04L 67/42* (2013.01); *G06F 16/13* (2019.01); *G06F 16/182* (2019.01); *G06F 16/188* (2019.01); *G06F 16/283* (2019.01)

(58) Field of Classification Search
CPC ..... H04L 67/42; G06F 16/182; G06F 16/188; G06F 16/283; G06F 16/13
USPC ................ 709/201, 203, 217, 218, 219, 226
See application file for complete search history.

(56) References Cited

U.S. PATENT DOCUMENTS

| 5,737,536 A | 4/1998 | Herrmann et al. |
| 6,976,060 B2 | 12/2005 | Manczak et al. |

(Continued)

OTHER PUBLICATIONS

3RV1S, "Unable to Add Folders to indexed Folders List," Apr. 16, 2012, pp. 1-3, Synology Inc, Online Community Forum.

(Continued)

*Primary Examiner* — Liang Che A Wang
(74) *Attorney, Agent, or Firm* — HPI Patent Department (57) ABSTRACT

Some examples provide a non-transitory computer readable medium having instructions executable by a processor of a computing device. The instructions can cause the processor to establish remote access by the computing device to a network-based storage resource, and establish the remote access based on a hardware identifier associated with the computing device. The instructions can cause the processor to generate, at the computing device, a local index for the remote data stored on the network-based storage resource and available to the computing device through the remote access. The instructions can cause the processor to provide, based on the local index, local access to the remote data through a virtual file system at the computing device.

15 Claims, 6 Drawing Sheets

(56) References Cited

U.S. PATENT DOCUMENTS

| | | |
|---|---|---|
| 7,701,912 B2 | 4/2010 | Thompson et al. |
| 2006/0056446 A1 | 3/2006 | Lee et al. |
| 2006/0174943 A1 | 8/2006 | Alff |
| 2006/0253852 A1* | 11/2006 | Honda ............. H04L 12/12 717/177 |
| 2008/0071403 A1* | 3/2008 | Conway ............ C30B 1/02 700/97 |
| 2008/0229040 A1 | 9/2008 | Honma |
| 2009/0202069 A1* | 8/2009 | Cox ................ G06F 21/10 380/44 |
| 2010/0235833 A1* | 9/2010 | Huang ............. G06F 21/575 718/1 |
| 2010/0290398 A1 | 11/2010 | Choudhary et al. |
| 2010/0332401 A1* | 12/2010 | Prahlad .......... G06F 17/30082 705/80 |
| 2011/0066668 A1 | 3/2011 | Guarraci |
| 2011/0167262 A1* | 7/2011 | Ross ............... H04W 12/06 713/168 |
| 2011/0187505 A1* | 8/2011 | Faith ............... G06F 1/1694 340/10.1 |
| 2011/0258199 A1* | 10/2011 | Oliver ............. G06F 17/3053 707/746 |
| 2012/0072723 A1 | 3/2012 | Orsini et al. |
| 2012/0144464 A1* | 6/2012 | Fakhrai ............ G06F 21/41 726/6 |
| 2013/0297662 A1 | 11/2013 | Sharma et al. |
| 2014/0025960 A1* | 1/2014 | McLean ........... G06F 21/575 713/189 |
| 2014/0289223 A1* | 9/2014 | Colwell .......... G06F 17/30477 707/722 |
| 2014/0325013 A1 | 10/2014 | Tamir et al. |
| 2015/0043553 A1* | 2/2015 | Swinkels ......... H04L 41/0806 370/338 |

OTHER PUBLICATIONS

Sun-Ho Lee and Im-Yeong Lee; "A Secure Index Management Scheme for Providing Data Sharing in Cloud Storages," J Inf Process Syst, Jun. 2013, pp. 1-14, vol. 9, No. 2.

Yao Liu et al: "Inferring Client Distribution by Using Dyad BitTorrent Network Data", Computer Science and Electronics Engineering, Mar. 23, 2012, pp. 615-619.

* cited by examiner

ACCESS TO NETWORK-BASED STORAGE RESOURCE BASED ON HARDWARE IDENTIFIER

BACKGROUND

Today's modern computer systems have extended their capabilities by leveraging computing resources accessible over a network, especially with the emergence of cloud-based resources. For example, through use of network-accessible storage resources, a given computer system can effectively increase its data storage capacity beyond the capabilities of its local storage resources. Additionally, network-accessible storage resources can permit a given computer system to access data that is accessible by another computer system, or store data such that the stored data is accessible by another computer system.

BRIEF DESCRIPTION OF THE DRAWINGS

Certain examples are described in the following detailed description in reference to the following drawings.

DETAILED DESCRIPTION OF SPECIFIC EXAMPLES

This disclosure describes example techniques for providing a computer system access to remote data stored on a network-based storage resource, and providing such access based on a hardware identifier associated with the computer system. According to some examples, the network-based storage resource is a cloud-based storage resource, and access to the cloud-based storage resource by the computer system is mapped according to the hardware identifier associated with the computer system. As described by this disclosure, the hardware identifier may comprise a trusted hardware identifier obtained from the computer system during a secure process, such a secure boot process. Additionally, after access to the network-based storage resource by computer system is established (e.g., based on the hardware identifier associated with the computer system), the computer system can provide access to the network-based storage resource as local access at the computer system, such as a local drive or as a directory integrated as part of the local file system of the computer system.

As used herein, a hardware identifier can be one associated with a computer system and comprising, for example, a part number, a model number, a serial number, or the like. For instance, a hardware identifier associated with a computer system can be a part number or a serial number associated with a hardware component included by the computer system, such as a network card, video card, storage device, or motherboard. As another example, a hardware identifier associated with a computer system can be a model number assigned to the computer system by the vendor of the computer system. Additionally, a hardware identifier associated with a computer system may be one generated based on one or more identifiers associated with hardware components of the computer system. For instance, a hardware identifier for a computer system can be generated by combining together two or more of (e.g., concatenating) a serial number of a central processing unit (CPU) of the computer system, a serial number of a hard drive (HDD) of the computer system, a media access control (MAC) of a network adapter of the computer system, and a serial number assigned to the computer system itself. A hardware identifier associated with a computer system may or may not be unique to the computer system. Where the hardware identifier is unique to the computer system, various examples can restrict access to certain remote data on stored on the network-based storage resource to only the computer system.

Various examples described herein can provide a computer system access to remote data, including software update files, firmware update files, manuals, guides, driver files, and the like, based on the computer system's associated hardware identifier. In this way, such examples can use the hardware identifier associated with a computer system to map the computer system's remote access to appropriate remote data (e.g., data items, such as files or directories) stored on a network-based storage resource.

Consider, for instance, multiple computers each having a different hardware identifier (e.g., different model number) but each including the same-type of hardware component, such as a motherboard of the same type, model number or part number. Certain examples can be utilized to instantly and transparently provide local access, at those computer systems, to a new driver for the hardware component. Such examples may utilize the different hardware identifiers of the computer systems to determine that a common attribute of those systems is the specific hardware component, and that the new driver (for the specific hardware component) relates to the common attribute.

Prior to an end-user receiving a computer system for use, various examples obviate the need for computer system to be pre-loaded with vendor-provided technical support files, such as manuals, guides, or frequently-asked-questions for the computer system. Based on a hardware identifier associated with the computer system, those various examples may provide the technical support files from a network-based storage resource that is transparently and locally accessible by a user at the computer system. For example, manuals or guides for the computer system, stored on the network-based storage resource separate from the computer system, may be made available for access at the computer system through a local directory of the computer system that lists the manuals or guides. Likewise, as new vendor-provided technical support files, such as software update files or firmware update files, are added to the network-based storage resource (e.g., added by vendor of the computer system), those files may be made locally available at the computer system through the hardware identifier-based access described herein. By utilizing the hardware identifier to determine access to the network-based storage resource, various examples ensure that one or more vendor-provided technical support files, stored on the network-based storage resource and relevant to the computer system (e.g., relevant to one or more of its various hardware components), are made locally available at the computer system.

Some described examples can facilitate, or assist in, technical support of a computer system, which may be provided by a manufacturer, retailer, or vendor (hereafter commonly referred to as vendor) of the computer system. For instance, some examples can enable a technical support provider to quickly and easily provide a user at a computer system with technical support data (e.g., technical support instructions, software patches, etc.) or to receive technical support data from the user of the computer system (e.g., core dumps, log files, or diagnostic reports generated by the computer system).

As used herein, with respect to a given computer system, local data can include data stored on a local storage device, and remote data can include data stored on a device or a system separate from the given computer system but accessible by the given computer system over a communications network. As also used herein, a network-based storage resource can include one or more data storage devices that, alone or as part of one or more server systems, can be accessed by a client systems over a communications network. For instance, the network-based storage resource may be a cloud-based storage resource. Remote data stored on a network-based storage resource can include one or more data items, such as files, directories, and other data structures.

Figure 1:
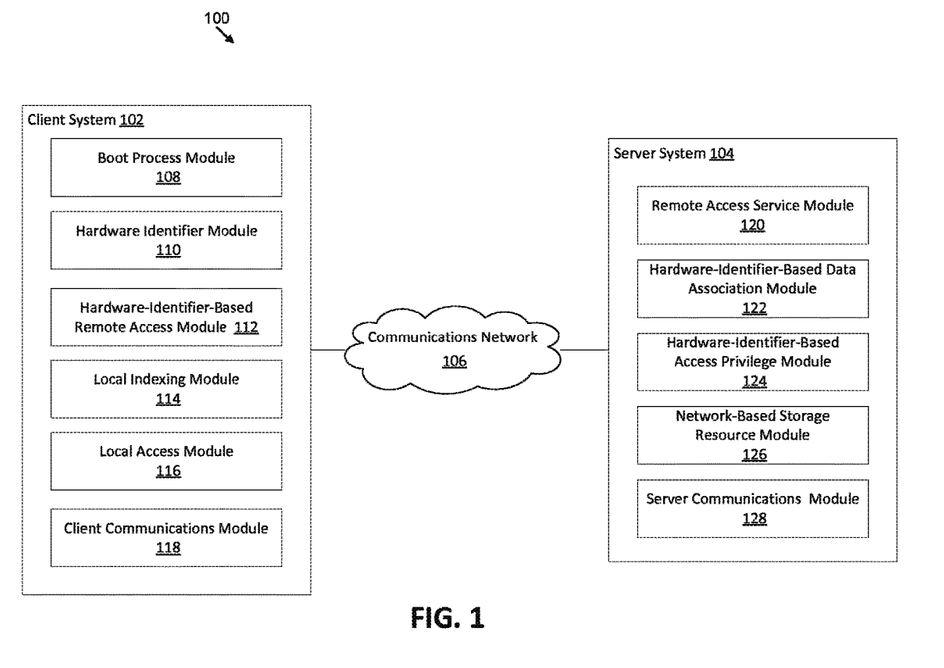
FIG. 1 illustrates an example environment including an example client system in communication with an example server system.

FIG. 1 illustrates an environment 100 including an example client system in communication with an example server system. FIG. 1 illustrates an environment 100 including an example client system 102 in communication with an example server system 104 over a communications network 106. As shown, the client system 102 includes a boot process module 108, a hardware identifier module 110, a hardware-identifier-based remote access module 112, a local indexing module 114, a local access module 116, and a client communications module 118. Depending on the example, the client system 102 may comprise a desktop, laptop, hand-held computing devices (e.g., personal digital assistants, smartphones, tablets, etc.), workstations, gaming devices, retail point of sale devices, wearable computing devices (e.g., smart watches, smart glasses, smart bands, smart apparel, etc.) and the like. The server system 104 includes a remote access service module 120, a hardware-identifier-based data association module 122, a hardware-identifier-based access privilege module 124, a network-based storage resource module 126, and a server communications module 128. Depending on the example, the server system 104 may comprise one or more servers, which may be operating on, or implemented, using one or more cloud-based resources, such as a System-as-a-Service (SaaS), Platform-as-a-Service (PaaS), or Infrastructure-as-a-Service (IaaS). In various examples, the components or the arrangement of components in the environment 100 may differ from what is depicted in FIG. 1. For instance, the client system 102 or the server system 104 can include more or less components than those depicted in FIG. 1.

As used herein, modules and other components of various implementation may comprise, in whole or in part, machine-readable instructions or electronic circuitry. For example, a module may comprise computer-readable instructions executable by a processor to perform one or more functions in accordance with various examples described herein. Likewise, in another example, a module may comprise electronic circuitry to perform one or more functions in accordance with various examples described herein. The elements of a module may be combined in a single package, maintained in several packages, or maintained separately.

The communications network 106 permits data to be communicated between the client system 102 and the server system 104 in accordance with various examples described herein. In some examples, the communications network 106 may comprise one or more local or wide-area communications networks, such as the Internet, WiFi networks, cellular networks, private networks, public networks, and the like.

With respect to the client system 102, the boot process module 108 may manage or otherwise facilitate a process for booting the client system 102. Depending on the example, the boot process module 108 may manage a hard boot of the client system 102 (e.g., after electrical power to the client system 102 is switched from off to on) or manage soft boot of the client system 102 (e.g., operating system initiated restart). When booting, the client system 102 may perform one or more basic input-output operating system (BIOS) processes, including power-on self-test (POST) processes, before an operating system for the client system 102 is loaded for execution (e.g., Microsoft® Windows®, UNIX, Linux, etc.).

The hardware identifier module 110 may facilitate obtaining a hardware identifier associated with the client system 102. As described herein, a hardware identifier can comprise a part number, a model number, or a serial number, or the like, and may be one generated based on one or more identifiers associated with hardware components of the client system 102. The hardware identifier module 110 may obtain the hardware identifier by accessing hardware information for the client system 102, and may access such information directly from pertinent hardware components of the client system 102 or through an operating system running on the client system 102.

For some examples, the hardware identifier may be obtained during a process for booting the client system 102, which may be managed by the boot process module 108. Additionally, for some examples, the hardware identifier comprises a trusted hardware identifier obtained during boot of the client system 102. For instance, the trusted hardware identifier may be obtained by a secure boot process of the client system 102, which may utilize a BIOS-controlled secure chain-of-trust boot process. During boot of the client system 102, a BIOS-controlled secure chain-of-trust boot process may load a hypervisor runtime for the client system 102 and the hypervisor runtime, in turn, may obtain a trusted hardware identifier for the client system 102. The hypervisor runtime may store the trusted hardware identifier to a secure storage on the client system 102, such a trusted platform module (TPM), for subsequent retrieval through the hypervisor runtime by a guest operating system running over the hypervisor runtime. The hardware identifier obtained by the hypervisor runtime may be one (e.g., serial number, part number, model number, etc.) associated with a component of the client system 102 (e.g., network adapter), or may be one generated by the hypervisor runtime based on combination of two or more identifiers associated with components of the client system 102 (e.g., serial number of motherboard and serial number of hard drive).

The hardware-Identifier-based remote access module 112 may facilitate remote access by the client system 102 to a network-based storage resource. For some examples, the hardware-identifier-based remote access module 112 establishes remote access to the network-based storage resource based on the hardware identifier obtained by the hardware identifier module 110. For example, the hardware-identifier-based remote access module 112 may utilize the hardware identifier when establishing the remote access to the network-based storage resource, and may utilize the hardware identifier by providing the hardware identifier to the network-based storage resource during remote access establishment. Where the hardware identifier comprises a trusted hardware identifier associated with the client system 102 (e.g., one obtained during a secure boot process of the client system 102), the hardware-identifier-based remote access module 112 can establish remote access to the network-based storage resource using trusted hardware information, which may be in place of, or in addition to traditional user credential information (e.g., username, password, etc.).

In certain examples, the hardware-identifier-based remote access module 112 (or some other component of the client system 102) utilizes the hardware identifier with one or more various forms of user credential information, such as a username, a password, a certificate, a token, biometric information, or the like, when establishing remote access to the network-based storage resource.

For some examples, the network-based storage resource is remotely accessible by the client system 102 through the server system 104. Accordingly, the hardware-identifier-based remote access module 112 may establish remote access to the network-based storage resource through the server system 104, and may do so over a connection established over the communications network 106. In addition, the hardware-identifier-based remote access module 112 may provide the hardware identifier to the server system 104 when remote access by the client system 102 to the network-based storage resource is being established. In the example of FIG. 1, the network-based storage resource may be part of the server system 104 or may be separate from, but communicatively coupled to, the server system 104. As such, the server system 104 may include the network-based storage resource or serve as an intermediary (e.g., for data flow) between the client system 102 and the network-based storage resource.

Once the remote access is established, the client system 102 can write data to, or read data from, the network-based storage resource through the remote access. The remote access may comprise access privileges that determine data access (e.g., determine the limitations of access) by the client system 102 to the network-based storage resources. The access privileges may, for instance, determine what types of data the client system 102 can write to the network-based storage resource, determine where on the network-based storage resource the client system 102 can write data, or determine how much data the client system 102 can write to the network-based storage resource. Additionally, the access privilege may determine whether the client system 102 can modify a data item stored on the network-based storage and, if so, what aspects of the data item the client system 102 can modify. Furthermore, the access privilege may determine what types of data the client system 102 can read from the network-based storage resource, determine what data items stored on the network-based storage resource the client system 102 can read, or determine locations on the network-based storage resource from which the client system 102 can read data.

It will be understood that the remote access to the network-based storage resource established by the client system 102 using its respective hardware identifier can differ (e.g., in access privileges or scope) from remote access to the network-based storage resource established by another client system using its respective hardware identifier. Accordingly, the files or directories of the network-based storage resource available for access to the client system 102 through its respective remote access may differ from the files or directories available for access to the other client system through its respective remote access.

The local indexing module 114 may facilitate generation of a local index for remote data stored on the on the network-based storage resource and available through the remote access established by the hardware-identifier-based remote access module 112. The local indexing module 114 may, for instance, generate a local index of one or more data items stored on the network-based storage resources, such as files or directories, and available through the established remote access by the hardware-identifier-based remote access module 112. For some examples, the local index may comprise one or more file handles or directory handles. As described herein, the hardware identifier can determine the remote access by the client system 102 to the network-based storage resource, and the access privileges of the remote access can determine which data items are available to the client system 102 through the remote access. In this way, the hardware identifier can determine the data items stored on the network-based storage resource and available to the client system 102.

The local access module 116 may facilitate providing local access, at the client system 102, to remote data stored on the network-based storage source and available through the remote access established by the hardware-identifier-based remote access module 112. For some examples, the local access module 116 provides the local access at the client system based on the local index generated by the local indexing module 114. The local index may assist the local access module 116 in identifying remote data that is stored on the network-based storage source, that are available through the remote access, and that are to be listed for local access at the client system 102. Depending on the example, the local index may identify one or more data items included by the remote data stored on the network-based storage resource.

For certain examples, the local access module 116 provides local access, at the client system 102, to remote data (e.g., data items) stored on the network-based storage resource as a local directory or a local drive. For instance, the local access module 116 can implement the local access as a directory integrated into the local file system of the client system 102. In some examples, the local access module 116 uses a virtual file system (VFS) at the client system 102 to implement the local access to the remote data stored on the network-based storage resource (e.g., as a local directory or a local drive at the client system 102).

As remote data stored on the network-based storage resource is accessed at the client system 102 through the local access provided by the local access module 116, the remote data can be fetched by the client system 102 from the server system 104 over the communications network 106. The remote data accessed at the client system 102, through the local access provided by the local access module 116, may be locally cached at the client system 102 once fetched from the network-based storage resource. The accessed remote data may be temporarily cached based on the age of the cached data, cache storage constraints at the client system 102, or the data type of the cached data. As described herein, the remote data can include vendor-provided technical support data, such as driver files, software update files, or firmware update files.

Depending on the example, the local access provided by the local access module 116 may include offline caching, whereby data fetched from the network-based storage resource can still be accessed when remote access to the network-based storage resource through the server system 104 is terminated or interrupted (e.g., when the client system is offline with respect to the server system 104). Where the local access includes offline caching, data written to the local access (e.g., files written to the local directory mapped to the network-based storage resource) can be locally cached at the client system 102 and then later synced with the network-based storage resource after remote access to the network-based storage resource through the server system 104 is established or re-established.

As the client system 102 writes local data to the local access provided by the local access module 116, the local data can be transmitted over the communications network 106 to the server system 104 for storage on the network-based storage resource. The local data written to the local access may include, for example, user-provided technical support data, such as a core dump, a log file, or a diagnostic report generated by the client system 102.

The client communications module 118 may facilitate communication between the client system 102 and the server system 104 over the communications network 106. For example, the client communications module 118 may facilitate the hardware-identifier-based remote access module 112 establishing remote access to a network-based storage resource over the communications network 106, through the server system 104. Once remote access is established with the network-based storage resource, the client communications module 118 may facilitate data flow between the client system 102 and the network-based storage resource over the communications network.

Referring now to the server system 104, the remote access service module 120 may provide the client system 102 with remote access to a network-based storage resource through the server system 104. According to some examples, the remote access service module 120 provides the client system 102 with remote access to the network-based storage resource after the client system 102 has established the remote access using the hardware identifier associated with the client system 102. During remote access establishment, the client system 102 may provide the remote access service module 120 with the hardware identifier. The remote access service module 120 can identify the client system 102 using the hardware identifier, and can further grant or deny remote access to the client system 102 based on the hardware identifier. In this way, the hardware identifier may be used by the remote access service module 120 to authenticate remote access of the network-based storage resource by the client system 102.

In certain examples, the remote access service module 120 may utilize one or more various forms of user credential information, such as a username, a password, a certificate, a token, biometric information, or the like, to authenticate remote access of the network-based storage resource by the client system 102. The use of such user credential information may be in addition to, or in lieu of, using the hardware identifier to authenticate the remote access by the client system 102.

Additionally, the hardware identifier can be provided to other components of the server system 104, such as the hardware-identifier-based data association module 122 and the hardware-identifier-based access privilege module 124, to enable the server system 104 to perform operations in accordance with examples described herein. As described herein, once the remote access is established, the client system 102 can access remote data stored on the network-based storage resource through the remote access.

The hardware-identifier-based data association module 122 may facilitate determination of remote data stored on the network-based storage resource and associated with the client system 102. According to some examples, the determination is based on the hardware identifier provided by the client system 102 to the server system 104.

For example, where the remote data stored on the network-based storage resource includes one or more data items (e.g., files or directories), those data items associated with the client system 102 may be identified using the hardware identifier associated with the client system 102. This may be useful where, for instance, the network-based storage resource includes one or more driver files, software update files, or firmware update files relating hardware components of computer systems. The hardware identifier provided by the client system 102 permits the hardware-identifier-based data association module 122 to determine which of the driver files, software update files, or firmware update files stored on the network-based storage resource are related to one or more hardware components of the client system 102. To determine which of the driver files, software update files, or firmware update files are related to one or more hardware components of the client system 102, the hardware-identifier-based data association module 122 can use the hardware identifier to obtain a hardware profile for the client system 102 (e.g., from a vendor database), which may describe one or more of the hardware components of the client system 102.

The hardware-identifier-based access privilege module 124 may facilitate determination of an access privilege of the client system 102 to the network-based storage resource. As described herein, the remote access provided by the remote access service module 120 may comprise the access privilege determined by the hardware-identifier-based access privilege module 124. Based on the hardware identifier provided by the client system 102, the hardware-identifier-based access privilege module 124 may determine that the client system 102 has read, write, or read-and-write access with respect to the network-based storage resource, or with respect to certain data stored on the network-based storage resource.

For instance, the hardware-identifier-based access privilege module 124 may determine that the client system 102 has read-only access with respect to vendor-provided technical data stored on the network-based storage resource. As another example, the hardware-identifier-based access privilege module 124 may determine that the client system 102 has write-only access or read-and-write access with respect to user-provided technical support data written to the network-based storage resource by the client system 102. For some examples, a vendor or administrator may have read-and-write access with respect to remote stored on the network-based storage resource, which may include vendor-provided technical support data and user-provided technical support data.

The network-based storage resource module 126 may facilitate access of a network-based storage resource by the client system 102. As described herein, the network-based storage resource may be part of the server system 104 or may be separate, but communicatively coupled to, the server system 104. For example, the network-based storage resource may comprise one or more local storage devices (e.g., hard disk drives, solid state drives, etc.) of the server system 104. As another example, the network-based storage resource comprises a cloud-based storage resource.

The server communications module 128 may facilitate communication between the server system 104 and the client system 102 and over the communications network 106. For instance, the server communications module 128 may facilitate the remote access service module 120 providing the client system 102 with remote access to the network-based storage resource.

Figure 2:
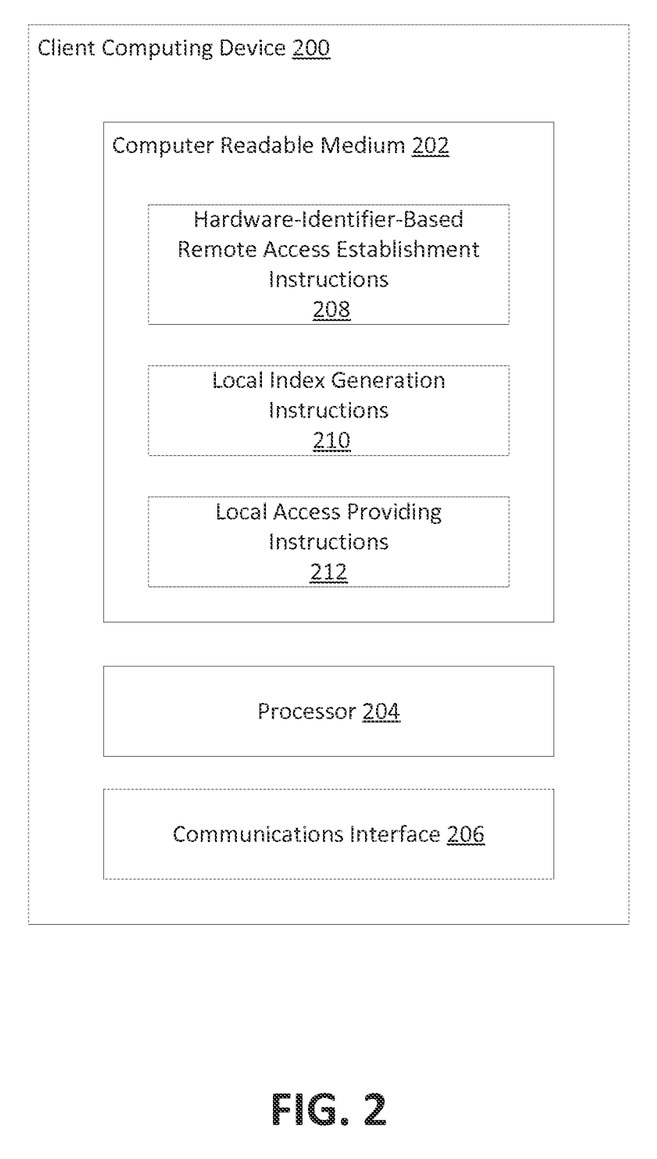
FIG. 2 illustrates an example client computing device.

FIG. 2 illustrates an example client computing device 200. As shown, the client computing device 200 includes a computer-readable medium 202, a processor 204, and a communications interface 206. In various examples, the components or the arrangement of components of the client computing device 200 may differ from what is depicted in FIG. 2. For instance, the client computing device 200 can include more or less components than those depicted in FIG. 2.

The computer-readable medium 202 may be any electronic, magnetic, optical, or other physical storage device that stores executable instructions. For example, the computer-readable medium 202 may be a Random Access Memory (RAM), an Electrically-Erasable Programmable Read-Only Memory (EEPROM), a storage drive, an optical disc, or the like. The computer-readable storage medium 202 can be encoded to store executable instructions that cause the processor 204 to perform operations in accordance with various examples described herein. In various examples, the computer-readable storage medium 202 is non-transitory. As shown in FIG. 2, the computer-readable storage medium 202 includes a hardware-identifier-based remote access establishment instructions 208, local index generation instructions 210, and local access providing instructions 212.

The processor 204 may be one or more central processing units (CPUs), microprocessors, or other hardware devices suitable for retrieval and execution of one or more instructions stored in the computer-readable medium 202. The processor 204 may fetch, decode, and execute the instructions 208, 210, and 212 to enable the client computing device 200 to perform operations in accordance with various examples described herein. For some examples, the processor 204 may include one or more electronic circuits comprising a number of electronic components for performing the functionality of one or more of the instructions 208, 210, and 212.

The hardware-identifier-based remote access establishment instructions 208 may cause the processor 204 to establish remote access to a network-based storage resource based on a hardware identifier associated with the client computing device 200. The local index generation instructions 210 may cause the processor 204 to generate a local index for remote data stored on the network-based storage resource and available to the client computing device 200 through the remote access. The local access providing instructions 212 may cause the processor 204 to provide, at the client computing device 200, local access to the remote data through a virtual file system.

Figure 3:
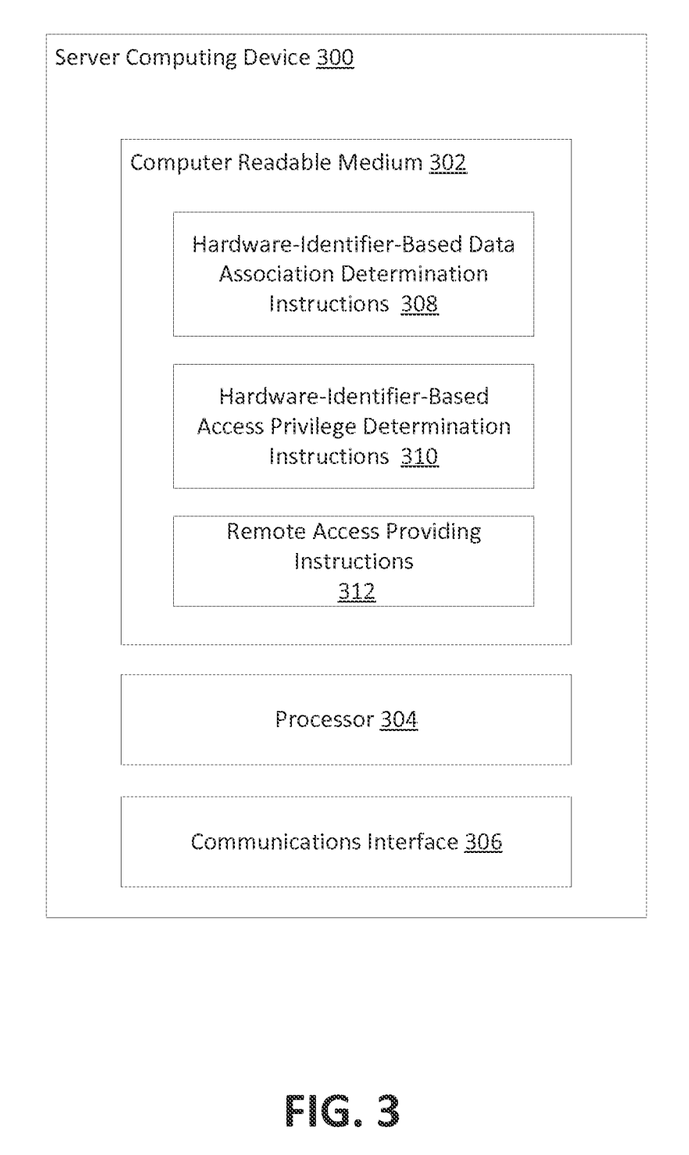
FIG. 3 illustrates an example server computing device.

FIG. 3 illustrates an example server computing device 300. As shown, the server computing device 300 includes a computer-readable medium 302, a processor 304, and a communications interface 306. In various examples, the components or the arrangement of components of the server computing device 300 may differ from what is depicted in FIG. 3. For instance, the server computing device 300 can include more or less components than those depicted in FIG. 3.

The computer-readable medium 302 may be similar to the computer-readable medium 202 of FIG. 2, and can be encoded to store executable instructions that cause the processor 304 to perform operations in accordance with various examples described herein. As shown in FIG. 3, the computer-readable storage medium 302 includes hardware-identifier-based data association determination instructions 308, hardware-identifier-based access privilege determination instructions 310, and remote access providing instructions 312.

The processor 304 may be similar to the processor 204 of FIG. 2. Accordingly, the processor 304 may fetch, decode, and execute the instructions 308, 310, and 312 to enable the server computing device 300 to perform operations in accordance with various examples described herein. For some examples, the processor 304 may include one or more electronic circuits comprising a number of electronic components for performing the functionality of one or more of the instructions 308, 310, and 312.

The hardware-identifier-based data association determination instructions 308 may cause the processor 304 to determine, based on a hardware identifier associated with a client computing device, remote data that is stored on a network-based storage resource and that is associated with the client computing device. The hardware-identifier-based access privilege determination instructions 310 may cause the processor 304 to determine, based on the hardware identifier, an access privilege of the client computing device to the remote data. The remote access providing instructions 312 may cause the processor 304 to provide the client computing device with remote access to the remote data, where the remote access comprises the access privilege.

Figure 4:
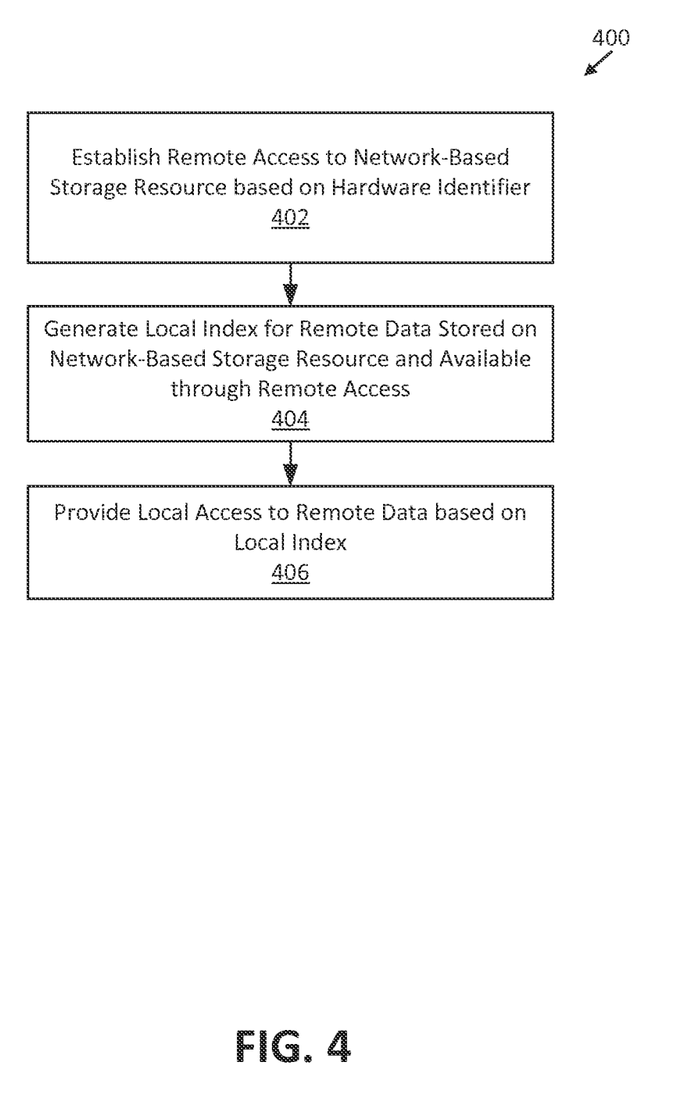
FIG. 4 illustrates an example method for providing local access to remote data at a client system based on a hardware identifier associated with the client system.

FIG. 4 illustrates an example method 400 for providing local access to remote data at a client system based on a hardware identifier. Although execution of method 400 is described below with reference to the client system 102 of FIG. 1, other suitable systems or devices for execution of method 400 can be possible, such as the client computing device 200 of FIG. 2. The method 400 may be implemented in the form of executable instructions stored on a computer-readable medium or in the form of electronic circuitry.

In FIG. 4, the method 400 begins at block 402, with the client system 102 establishing remote access to a network-based storage resource based on a hardware identifier associated with the client system 102. In some instances, the client system 102 establishes remote access to the network-based storage resource through the server system 104 over the communications network 106.

At block 404, the client system 102 generates local index for remote data stored on the network-based storage resource and available through the remote access. In some examples, the client system 102 generates the local index by identifying one or more data items (e.g., files or directories) stored on the network-based storage resource and available through the remote access established at block 402.

At block 406, the client system 102 provides local access to the remote data (on the network-based storage resource and available through the remote access) based on the local index. For example, based on the local index, the client system 102 may provide local access to the remote data at the client system 102 using a virtual file system. The local access may permit a software application operating on the client system 102, such a file exploration application (e.g., Microsoft® Explorer) or a post-script document reader (e.g., Adobe® Reader®), to access the remote data. Additionally, the local access at the client system 102 may be such that the remote data appears similar to local data at the client system 102 and may be such that the remote data is accessed at the client system 102 in a manner similar to the local data at the client system 102. In this way, the remote data may effectively appear local to the user and may not be differentiable to local data at the client system 102.

Figure 5:
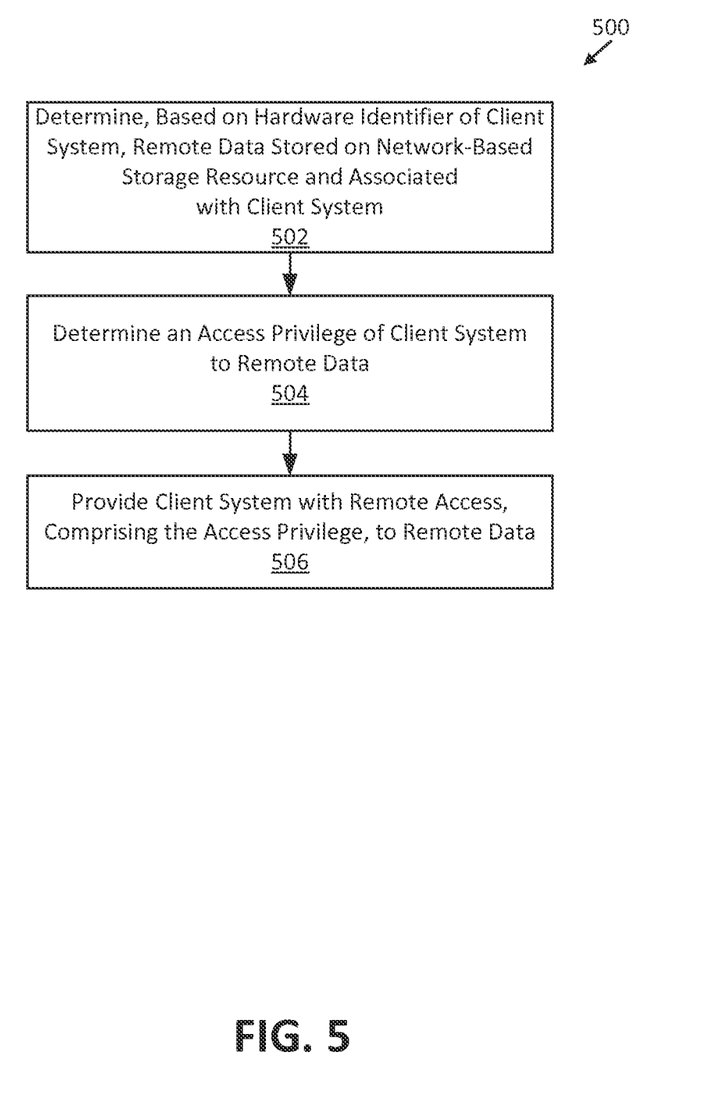
FIG. 5 illustrates an example method for providing a client system with remote access to data based on a hardware identifier.

FIG. 5 illustrates an example method 500 for providing a client system with remote access to data based on a hardware identifier. Although execution of method 500 is described below with reference to the server system 104 of FIG. 1, other suitable systems or devices for execution of method 500 can be possible, such as the server computing device 300 of FIG. 3. The method 500 may be implemented in the form of executable instructions stored on a computer-readable medium or in the form of electronic circuitry.

In FIG. 5, the method 500 begins at block 502, with the server system 104 determining, based on a hardware-identifier associated with a client system, remote data stored on a network-based storage resource and associated with the client system. For some examples, the server system 104 receives the hardware-identifier, such as a serial number, part number, or model number, from the client system and use the hardware identifier to determine one or more data items (e.g., driver files, firmware update files, etc.) stored on the network-based storage resource and associated with the client system (e.g., associated with one or more hardware components of the client system).

At block 504, the server system 104 determines, based on the hardware identifier associated with the client system, an access privilege of the client system to the remote data determined at block 502. In some examples, the server system 104 determines whether the client system has read, write, or read-write access with respect to the remote data determined at block 502.

At block 506, the server system 104 provides the client system with remote access to the remote data determined at block 502, where the remote access comprises the access privilege determined at block 504. Accordingly, for some examples, the server system 104 controls the remote access to the remote data according to the access privilege determined at block 504.

Figure 6:
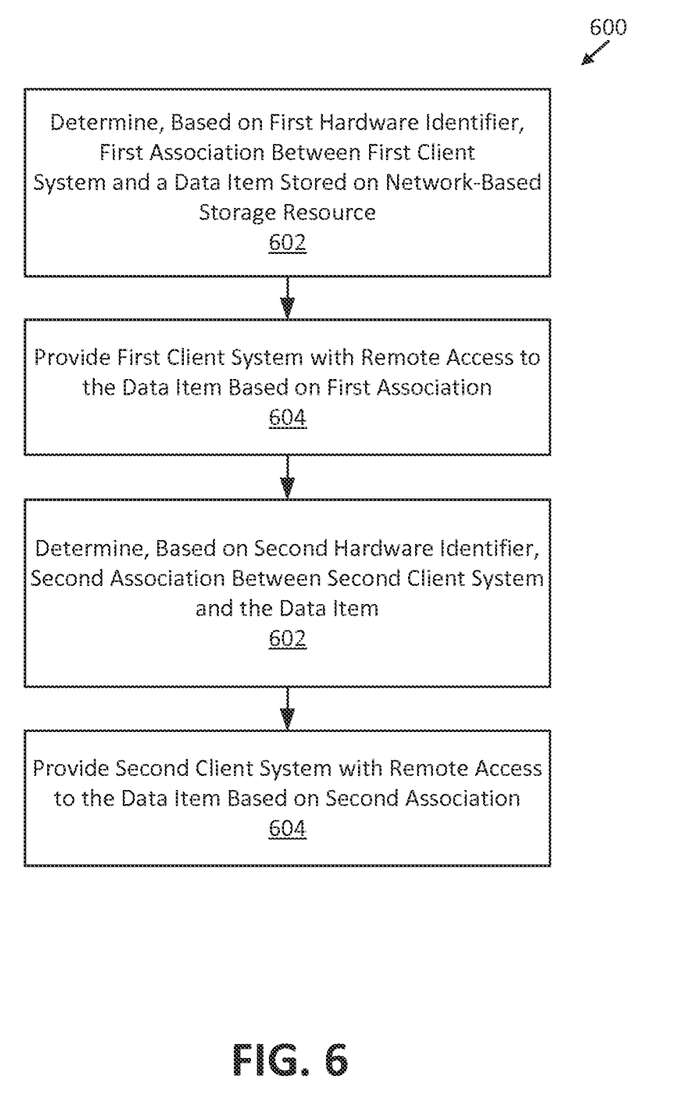
FIG. 6 illustrates an example method for providing a plurality of client systems with remote access to data based on a hardware identifier.

FIG. 6 illustrates an example method 600 for providing a plurality of client systems with remote access to data based on a hardware identifier. Although execution of method 600 is described below with reference to the server system 104 of FIG. 1, other suitable systems or devices for execution of method 600 can be possible, such as the server computing device 300 of FIG. 3. The method 600 may be implemented in the form of executable instructions stored on a computer-readable medium or in the form of electronic circuitry.

In FIG. 6, the method 600 begins at block 602, with the server system 104 determines a first association between a first client system and a data item stored on a network-based storage resource, and does so based on a first hardware identifier associated with the first client system. For instance, the first client system may provide the server system 104 with a serial number uniquely associated with the first client system.

At block 604, the server system 104 provides the first client system with remote access to the data item based on the first association determined at block 602.

At block 606, the server system 104 determines a second association between a second client system and the data item stored on a network-based storage resource, and does so based on a second hardware identifier associated with the second client system. For example, the second client system may provide the server system 104 with a model number associated with the second client system and other client systems of the same model as the second client system. As shown in FIG. 6, the same data item determined to have a first association with the first client system, at block 602, is determined to have a second association with second client system at block 604. This may occur, for example, where the data item is a driver file associated with a first component (e.g., video adapter) of the first client system and also associated with a second component of the second client system. The server system 104 can use the first hardware identifier (e.g., the serial number of the first client system) to determine that the first client system included the first component at the time of its manufacture, and can use the second hardware identifier (e.g., the model number of the second client system) to determine that the second client system included the second component at the time of its manufacture.

At block 608, the server system 104 provides the second client system with remote access to the data item based on the second association determined at block 606. In various examples, the remote access to the data item provided to the second client system at block 608 is separate from the remote access to the data item provide to the first client system at block 604. Using the first hardware identifier and the second hardware identifier may permit the server system 104 to determine a common attribute between the first client system and the second client system (e.g., have the same hardware component) and share access to data (e.g., driver file) associated to that common attribute.

For some examples, where access to a data item stored on the network-based storage resource is shared by more than one client system, a single copy of the data item may be maintained on the network-based storage resource and shared by those accessing client systems. Additionally, in certain examples, where data (e.g., vendor data) stored on the network-based storage resource is accessible by more than one client system, the server system 104 may generate a report regarding access client systems according to their common attributes (e.g., report of access of a data item by client systems having the same model number).

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A non-transitory computer readable medium having instructions stored thereon, the instructions being executable by a processor of a computing device to:
   establish, based on a hardware identifier associated with the computing device, remote access by the computing device to a network-based storage resource;
   determine, at the computing device, remote data stored on the network-based storage resource available to a client system based on the hardware identifier, wherein remote access of the computing device is mapped to the network-based storage resource based on the hardware identifier;
   determine, at the computing device, an access privilege of the client system to the network-based storage resource based on the hardware identifier;
   generate, at the computing device, a local index for remote data stored on the network-based storage resource and available to the computing device through the remote access; and
   provide, based on the local index, local access to the remote data including read-write access to vendor provided data and user provided data through a virtual file system at the computing device.

2. The non-transitory computer readable medium of claim 1, wherein the hardware identifier comprises a trusted hardware identifier.

3. The non-transitory computer readable medium of claim 2, wherein the trusted hardware identifier is obtained during a secure boot process of the computing device.

4. The non-transitory computer readable medium of claim 1, wherein the instructions are executable by the processor to fetch, from the network-based storage resource, a subset of the remote data that the computing device is attempting to access through the virtual file system.

5. The non-transitory computer readable medium of claim 1, wherein the instructions are executable by the processor to transmit, from the computing device to the network-based storage resource, local data that is written to the virtual file system by the computing device.

6. The non-transitory computer readable medium of claim 5, wherein the local data comprises user-provided technical support data generated at the computing device.

7. The non-transitory computer readable medium of claim 1, wherein the remote data comprises vendor-provided technical support data associated with the computing device.

8. The non-transitory computer readable medium of claim 1, wherein the remote data stored on the network-based storage resource includes at least one data item associated with the client system identified using the hardware identifier associated with the client system.

9. The non-transitory computer readable medium of claim 1, wherein the access privilege determines an aspect of the data item to modify in response to determining the client system modifies a data item stored on the network-based storage.

10. The non-transitory computer readable medium of claim 1, wherein the access privilege includes read, write, and read-and-write access with respect to the network-based storage resource.

11. A method, comprising:
establishing, based on a hardware identifier associated with a computing device, remote access by the computing device to a network-based storage resource;
determining, based on a hardware identifier associated with a client system, remote data stored on a network-based storage resource available to the client system, wherein remote access of the client system is mapped to the network-based storage resource based on the hardware identifier;
determining, based on the hardware identifier, an access privilege of the client system to the remote data on the network-based storage resource;
generating, at the client system, a local index for remote data stored on the network-based storage resource and available to the client system through the remote access; and
providing, based on the local index, the client system with a local access to the remote data including read-write access to vendor provided data and user provided data through a virtual file system at the client system.

12. The method of claim 11, wherein the remote data comprises vendor-provided technical support data associated with the client system, or user-provided technical support data generated at the client system.

13. The method of claim 11, wherein the remote data comprises vendor-provided data, and the method comprises generating a report regarding access of the vendor-provided data by the client system and by at least one other client system sharing a common attribute with the client system.

14. A computer system, comprising:
a processor; and
a memory including instructions being executable by the processor to:
establish, based on a hardware identifier associated with the computing system, remote access by the computing system to a network-based storage resource;
determine, based on a first hardware identifier associated with a first client system, a first association between a data item stored on a network-based storage resource and the first client system, wherein a first remote access of the first client system is mapped to the network-based storage resource based on the first hardware identifier;
determine, at the first client system, a first access privilege of the first client system to the network-based storage resource based on the first hardware identifier;
generate, at the first client system, a first local index for data item stored on the network-based storage resource and available to the first client system through the first remote access; and
provide, based on the first local index, first local access to the data item including read-write access to vendor provided data and user provided data through a virtual file system at the first client system;
determine, based on a second hardware identifier associated with a second client system, a second association between the data item and the second client system, wherein a second remote access of the second client system is mapped to the network-based storage resource based on the hardware identifier;
determine, at the second client system, a second access privilege of the second client system to the network-based storage resource based on the second hardware identifier;
generate, at the second client system, a second local index for data item stored on the network-based storage resource and available to the second client system through the second remote access; and
provide, based on the second local index, the second client system with the second remote access to the data item.

15. The computer system of claim 14, wherein the first client system and the second client system share a common attribute, and the remote item relates to the common attribute.

* * * * *